United States Patent
McKendry et al.

(10) Patent No.: US 7,183,938 B2
(45) Date of Patent: Feb. 27, 2007

(54) ROTATING BEACON SYSTEM

(75) Inventors: Scott McKendry, Tas (AU); Chris Laning, Tasmania (AU); Kevin Brewster, Tasmania (AU); Richard Ireland, Tasmania (AU)

(73) Assignee: Electronic Controls Company, Boise, ID (US)

( * ) Notice: Subject to any disclaimer, the term of this patent is extended or adjusted under 35 U.S.C. 154(b) by 217 days.

(21) Appl. No.: 10/938,201

(22) Filed: Sep. 10, 2004

(65) Prior Publication Data

US 2006/0055562 A1    Mar. 16, 2006

(51) Int. Cl.
*G08B 5/00* (2006.01)

(52) U.S. Cl. .................. 340/815.4; 340/331; 340/901; 362/35

(58) Field of Classification Search .............. 340/815.4
See application file for complete search history.

(56) References Cited

U.S. PATENT DOCUMENTS

| | | | | |
|---|---|---|---|---|
| 3,271,735 A | | 9/1966 | Gosswiller .................. 340/50 |
| 4,231,078 A | * | 10/1980 | Hitora .......................... 362/35 |
| 4,240,062 A | | 12/1980 | Gosswiller ................... 340/81 |
| 4,286,254 A | * | 8/1981 | Gosswiller .................. 340/472 |
| 4,319,306 A | * | 3/1982 | Stanuch ....................... 362/35 |
| 4,701,743 A | * | 10/1987 | Pearlman et al. ........... 340/472 |
| 5,408,389 A | * | 4/1995 | Burlingame ................. 362/35 |
| 5,422,623 A | | 6/1995 | Bader et al. ................ 340/331 |
| 5,517,388 A | * | 5/1996 | Hutchisson .................. 362/35 |
| 5,634,711 A | * | 6/1997 | Kennedy et al. ............ 362/119 |
| 6,100,791 A | * | 8/2000 | Bader et al. ................ 340/331 |

* cited by examiner

*Primary Examiner*—Daniel Wu
*Assistant Examiner*—Eric M. Blount
(74) *Attorney, Agent, or Firm*—Joseph W. Holland

(57) ABSTRACT

A rotating beacon system and a method for synchronizing multiple rotating beacons. The rotating beacon system includes two or more rotating beacons and a feedback based control system adapted to sense an angular position of each of the two or more rotating beacons and generate two or more digitally controlled currents, each of the two or more digitally controlled currents conducted to an associated rotating beacon, the two or more digitally controlled currents driving and controlling the angular speed of each of the two or more rotating beacons to regulate a pre-selected phase relationship between multiple beacons.

7 Claims, 5 Drawing Sheets

ROTATING BEACON SYSTEM

BACKGROUND OF THE INVENTION

1. Field of Invention

This invention relates to beacons and more particularly rotating beacons employed on various vehicles.

2. Background of the Invention

The use of rotating lights for various applications including warning and alert devices is known in the art. Interconnecting such rotating lights by mechanical drive means to synchronize a first rotating beacon with a second rotating beacon has also been demonstrated. See Gosswiller U.S. Pat. Nos. 3,271,735 and 4,240,062.

An object of the present invention is to provide a rotating beacon system that includes two or more rotating beacons and a circuit that controls an angular speed of each of the two or more rotating beacons to achieve and maintain a pre-selected phase relationship between the two or more rotating beacons. These and other objects and advantages of the invention will be apparent from the following description of a preferred embodiment, taken in conjunction with the accompanying drawings.

SUMMARY OF THE INVENTION

The present invention is directed to a rotating beacon system and a method for synchronizing multiple rotating beacons. The rotating beacon system includes two or more rotating beacons and a feedback based control system adapted to sense an angular position of each of the two or more rotating beacons and generate two or more digitally controlled currents. Each of the two or more digitally controlled currents are conducted to an associated rotating beacon, the two or more digitally controlled currents driving and controlling the angular speed of each of the two or more rotating beacons to regulate a pre-selected phase relationship between multiple beacons. In one embodiment, the feedback based control system includes an angular position sensing device associated with each of the two or more rotating beacons and a beacon control circuit. Each of the angular position sensing devices senses an angular position of the associated rotating beacon. Each of the angular position sensing devices are adapted to output an angular position signal for the associated rotating beacon. The beacon control circuit includes a digitally controlled current generator which produces two or more digitally controlled currents. Each digitally controlled current is a function of an angular position signal for an associated rotating beacon and a synchronizing signal generated by the beacon control circuit. The two or more digitally controlled currents are used to drive and control the angular speed of each of the two or more rotating beacons to regulate a pre-selected phase relationship between multiple beacons.

In one embodiment of the present invention, the beacon control circuit compares the angular position signal to the synchronizing signal and, dependant upon a programmed or selected operation mode to determine a phase differential factor for each rotating beacon.

In one preferred embodiment of the present invention, the digitally controlled current generator includes a square wave signal generator that generates a square wave signal and a pulse width modulated current generator that modulates a duty cycle of the square wave signal to produce two or more pulse width modulated currents, one for each of the rotating beacons. The square wave signal is modulated for each of the beacons as a function of the phase differential factor for that beacon providing a pulse width modulated current for each of the two or more rotating beacons. One of the two or more pulse width modulated currents drives and controls an angular speed of an associated one of the two or more rotating beacons to regulate a pre-selected phase relationship between the two or more rotating beacons.

In other embodiments of the invention, other feedback based control systems may be employed to produce two or more digitally controlled currents to drive and control an angular speed of each of the two or more rotating beacons. Additionally, in other embodiments of the invention, other digitally controlled current generating formats may be employed for instance, adjustable linear voltage may be employed to produce a digitally controlled current to control an angular speed of each of the two or more rotating beacons. The present invention consists of the combination and arrangement of parts hereinafter more fully described, illustrated in the accompanying drawings and more particularly pointed out in the appended claims, it being understood that changes may be made in the form, size, proportions and minor details of construction without departing from the spirit or sacrificing any of the advantages of the invention.

DETAILED DESCRIPTION OF THE INVENTION

Figure 1:
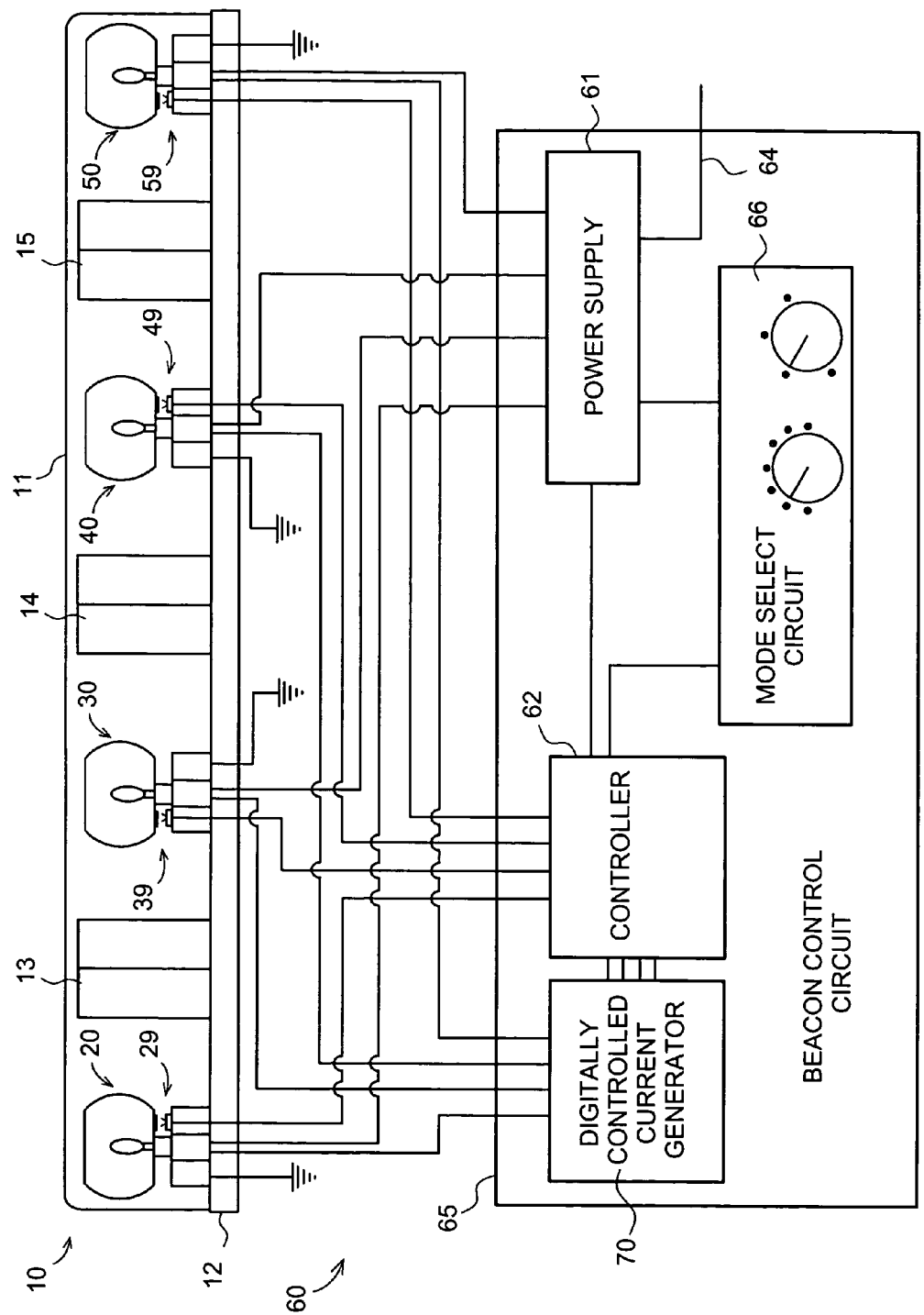
FIG. 1 is a schematic representation of a rotating beacon system according to a preferred embodiment of the present invention.
Figure 2:
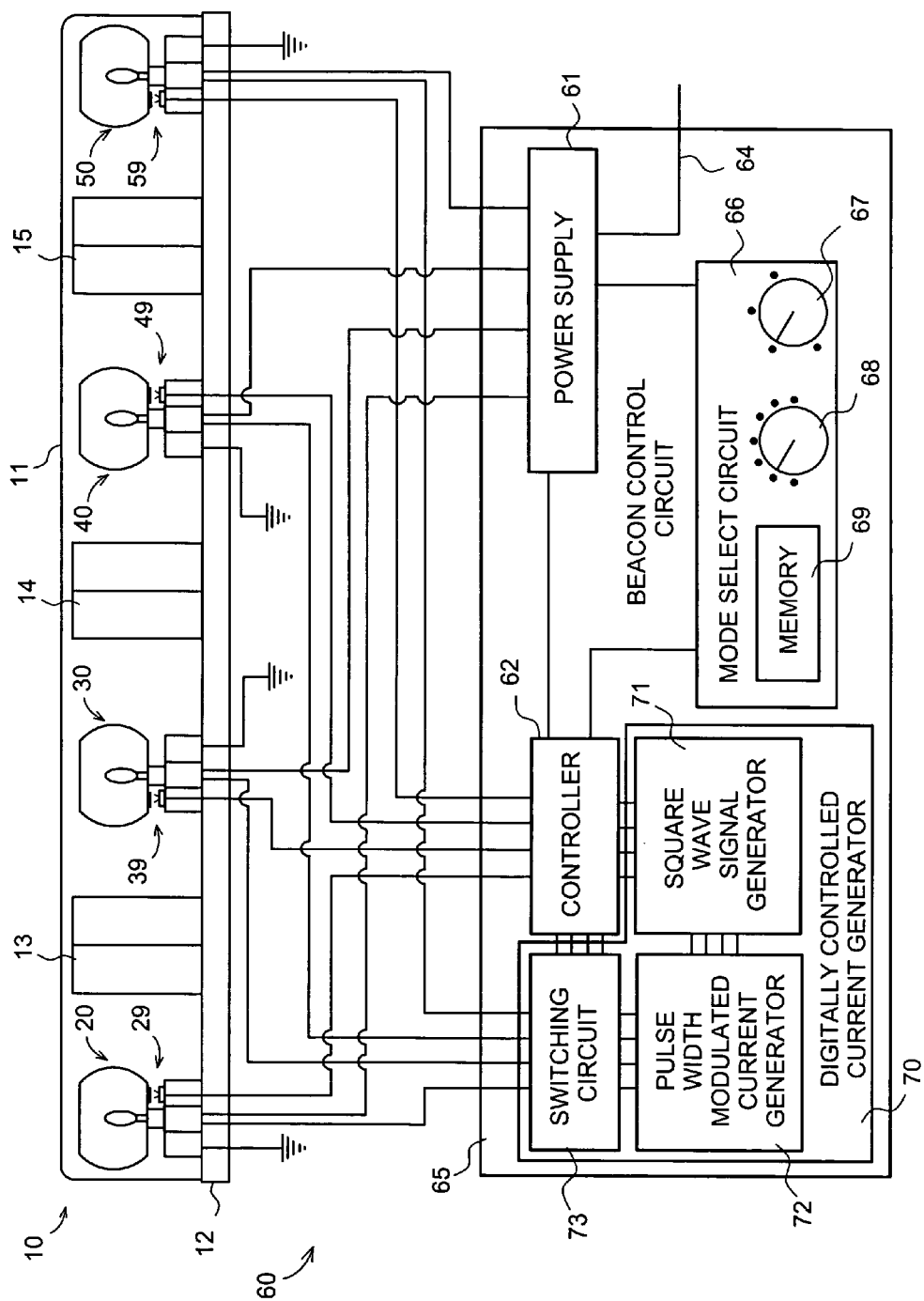
FIG. 2 is a schematic representation of a rotating beacon system according to a preferred embodiment of the present invention.

Referring to FIGS. 1 and 2, rotating beacon system 10 is shown including a base member 12 to which four rotating beacons 20, 30, 40 and 50 are mounted. The four rotating beacons 20, 30, 40 and 50 are enclosed within cover 11. Mirrors 13, 14 and 15 provide additional reflection of light emitted by the four rotating beacons 20, 30, 40 and 50. Rotating beacon system 10 also includes feedback based control system 60. Feedback based control system 60 includes beacon control circuit 65 and angular position sensing devices 29, 39, 49 and 59. Beacon control circuit 65 includes power supply 61 connected to a power source, (not shown), via conductor 67. Controller 62, mode select circuit 66 and digitally controlled current generator 70 are also connected to power supply 61. Power supply 61 also provides regulated current for the four rotating beacons 20, 30, 40 and 50.

In the embodiment of the invention shown in FIG. 2, digitally controlled current generator 70 includes square wave signal generator 71, pulse width modulated current generator 72 and switching circuit 73. Mode select circuit 66 includes power switch 67 that may switch power to the various rotating beacons 20, 30, 40 and 50. Mode select circuit 66 also includes mode select switch 68 used to select one of a variety of operation modes, for example, inner rotating beacons 30 and 40 synchronized with outer rotating beacons 20 and 50, inner rotating beacons 30 and 40 180° out of synchronization with outer rotating beacons 20 and 50, first and third rotating beacons 20 and 40 180° out of synchronization with second and fourth rotating beacons 30 and 40 or a staggered synchronization wherein each rotating beacon 20, 30, 40 and 50 is out of synchronization with the next in line rotating beacon 20, 30, 40 and 50 by 90°. Additionally, mode select circuit 62 allows for pre-selecting a flash mode, for instance, a single, alternating or double flash mode wherein the light emitting element of the various rotating beacons 20, 30, 40 and 50 flash at 0° (single flash), 0° and 180°, (alternate flashing), or at 0° and 90° (double flash). Memory 69 provides data storage for programming and data associated with the operation of rotating beacon system 10.

Figure 3:
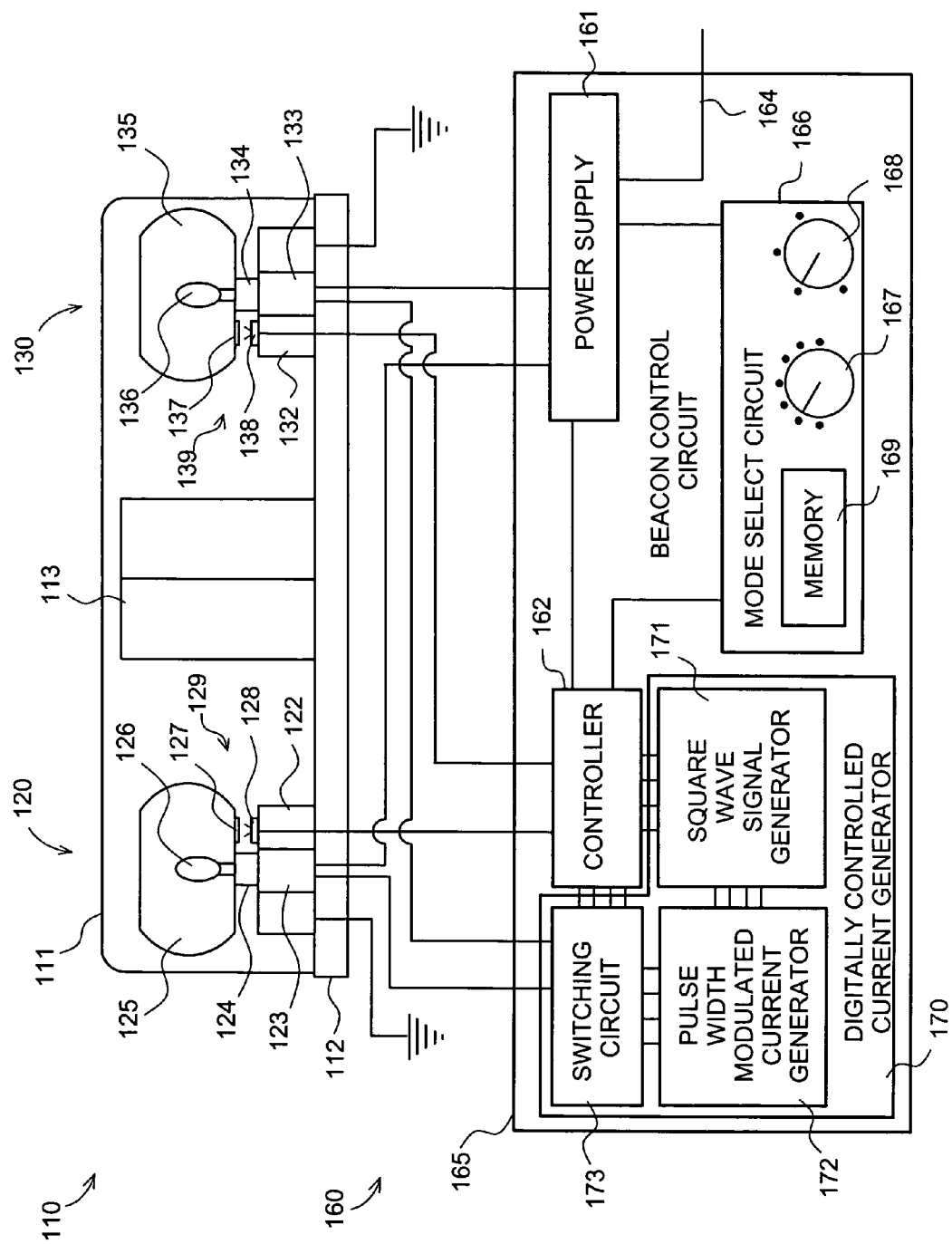
FIG. 3 is a schematic representation of a rotating beacon system according to a preferred embodiment of the present invention.

Referring to FIG. 3, an alternate embodiment of rotating beacon system 110 is shown including a pair of rotating beacons 120 and 130 mounted to base member 112. Rotating beacons 120 and 130 are enclosed within cover 111. Mirror 113 provides additional reflection of light emitted by rotating beacons 120 and 130. As seen in FIG. 3, rotating beacon 120 includes base 122 and motor 123. Rotating reflector 125 is connected to motor 123 at shaft 124. Light emitting element 126 provides illumination reflected by rotating reflector 125. Rotating beacon 130 also includes base 132 and motor 133. Rotating reflector 135 is connected to motor 133 at shaft 134. Light emitting element 136 provides illumination reflected by rotating reflector 135.

Referring to FIG. 3, while in the preferred embodiment of the invention, magnetic strip 127 serves as an angular position indicator while magnetic sensor 128 serves as an angular position sensor, other sensing devices and technologies may be employed to accomplish this sensing function. For instance an optical sensor may serve as an angular position sensor while an optical element, for instance a black dot may serve as the angular position indicator. In the described embodiment, and referring to rotating beacon 120, each time rotating reflector 125 with magnetic strip 127 rotates past magnetic sensor 128, magnetic sensor 128 senses the magnetic field through "Hall Effect".

Rotating beacon system 110 also includes feedback based control system 160. Feedback based control system 160 includes beacon control circuit 165 and angular position sensing devices 129 and 139. Beacon control circuit 165 includes power supply 161 connected to a power source, (not shown), via conductor 164. Power supply 161 provides regulated current for mode select circuit 166, controller 162 and digitally controlled current generator 170 including square wave signal generator 171 and pulse width modulated current generator 172 and switching circuit 173. Power supply 161 also provides regulated current for operation of motors 123 and 133 as well as light emitting elements 126 and 136. Mode select circuit 166 includes power switch 167 that may switch power to the rotating beacons 120 and 130. Mode select circuit 166 also includes mode select switch 168 used to select one of a variety of operation modes. Memory 169 provides data storage for programming and data associated with the operation of rotating beacon system 110.

Angular position sensing device 129 includes magnetic strip 127 and magnetic sensor 128. Magnetic strip 127 is attached to a surface of rotating reflector 125 and serves as an angular position indicator. A magnetic field associated with magnetic strip 127 is sensed by magnetic sensor 128 as it passes with each rotation of rotating reflector 125. Magnetic sensor 128 generates an angular position signal indicating an angular position of magnetic strip 127 and rotating reflector 125. Similarly, angular position sensing device 139 includes magnetic strip 137 and magnetic sensor 138. Magnetic strip 137 is attached to a surface of rotating reflector 135 and serves as an angular position indicator. A magnetic field associated with magnetic strip 137 is sensed by magnetic sensor 138 as it passes with each rotation of rotating reflector 135. Magnetic sensor 138 generates an angular position signal indicating an angular position of magnetic strip 137 and rotating reflector 135.

Figure 4:
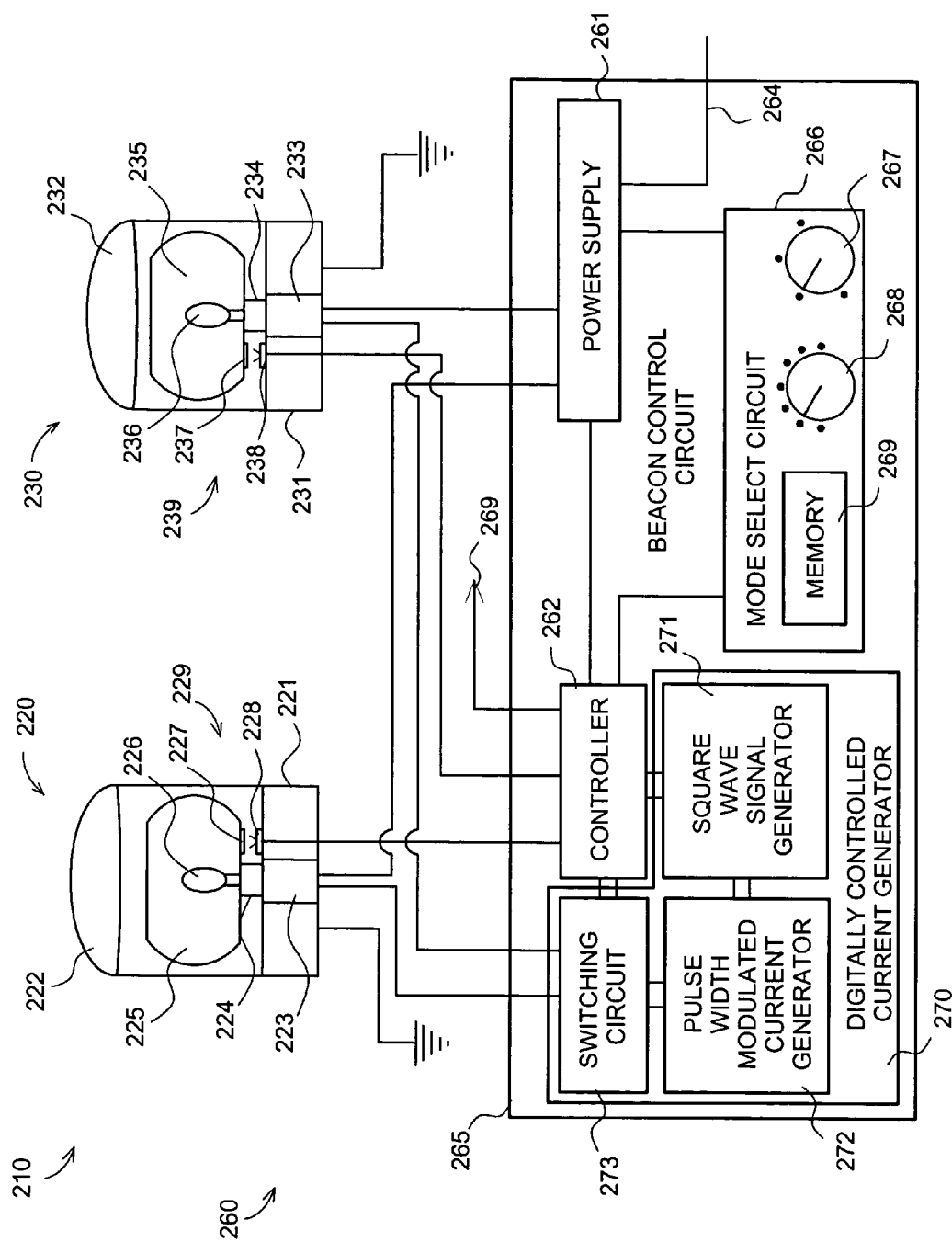
FIG. 4 is a schematic representation of a rotating beacon system according to a preferred embodiment of the present invention.

Referring to FIG. 4, an alternate embodiment of rotating beacon system 210 is shown including a pair of rotating beacons 220 and 230 which are mounted independent of one another. Rotating reflector 225 is enclosed within lens cover 222. Similarly, rotating reflector 235 is enclosed within lens cover 232. As shown in FIG. 4, rotating beacon 220 includes base 221 and motor 223. Rotating reflector 225 is connected to motor 223 at shaft 224. Light emitting element 226 provides illumination reflected by rotating reflector 225. Similarly, rotating beacon 230 includes base 231 and motor 233. Rotating reflector 235 is connected to motor 233 at shaft 234. Light emitting element 236 provides illumination reflected by rotating reflector 235.

Rotating beacon system 210 also includes feedback based control system 260. Feedback based control system 260 includes beacon control circuit 265 and angular position sensing devices 229 and 239. Beacon control circuit 265 includes power supply 261 connected to a power source, (not shown), via conductor 264. Power supply 261 provides regulated current for mode select circuit 266, controller 262 and digitally controlled current generator 270 including square wave signal generator 271 and pulse width modulated current generator 272 and switching circuit 273. Power supply 261 also provides regulated current for operation of motors 223 and 233 as well as light emitting elements 226 and 236. Mode select circuit 266 includes power switch 267 that may switch power to the rotating beacons 220 and 230. Mode select circuit 266 also includes mode select switch 268 used to select one of a variety of operation modes. Memory 269 provides data storage for programming and data associated with the operation of rotating beacon system 210. A synch out line 269 provides a capability wherein additional rotating beacon systems, LED's, flashers, sirens or the like, (not shown), may be linked and synchronized with each other.

Angular position sensing device 229 includes magnetic strip 227 and magnetic sensor 228. Magnetic strip 227 is attached to a surface of rotating reflector 225 and serves as an angular position indicator. A magnetic field associated with magnetic strip 227 is sensed by magnetic sensor 228 as it passes with each rotation of rotating reflector 225. Magnetic sensor 228 generates an angular position signal indicating an angular position of magnetic strip 227 and rotating reflector 225. Similarly, angular position sensing device 239 includes magnetic strip 237 and magnetic sensor 238. Magnetic strip 237 is attached to a surface of rotating reflector 235 and serves as an angular position indicator. A magnetic field associated with magnetic strip 237 is sensed by magnetic sensor 238 as it passes with each rotation of rotating reflector 235. Magnetic sensor 238 generates an angular position signal indicating an angular position of magnetic strip 237 and rotating reflector 235.

In operation and referring to FIG. 3 to illustrate the concepts of operation of rotating beacon system 110, an angular position signal is output by each magnetic sensor 128 and 138, representing the passing of a magnetic field associated with magnetic strip 127 and magnetic strip 137 respectively, indicating an angular position of rotating reflectors 125 and 135, is input to controller 162. Magnetic sensor 128 inputs an angular position signal representative of an angular position of rotating beacon 120 to controller 162. Similarly, magnetic sensor 138 inputs an angular position signal representative of an angular position of rotating beacon 130 to controller 162. Controller 162 calculates an angular speed and a phase relation of rotating beacon 120 and rotating beacon 130. Controller 162 also provides a synchronizing signal. The synchronizing signal is a constant regardless of an operation mode selected at mode select circuit 166. Square wave signal generator 171 generates a square wave signal. The square wave signal is modulated by pulse width modulated current generator 173 as a function of the synchronizing signal and the angular position signal for either rotating beacon 120 or rotating beacon 130. A first pulse width modulated current is conducted from switching circuit 173 to motor 123 and a second pulse width modulated current is conducted from switching circuit 173 to motor 133 to control the angular speed of rotating reflectors 125 and 135 respectively, regulating a pre-selected phase relationship between rotating reflectors 125 and 135.

Figure 5:
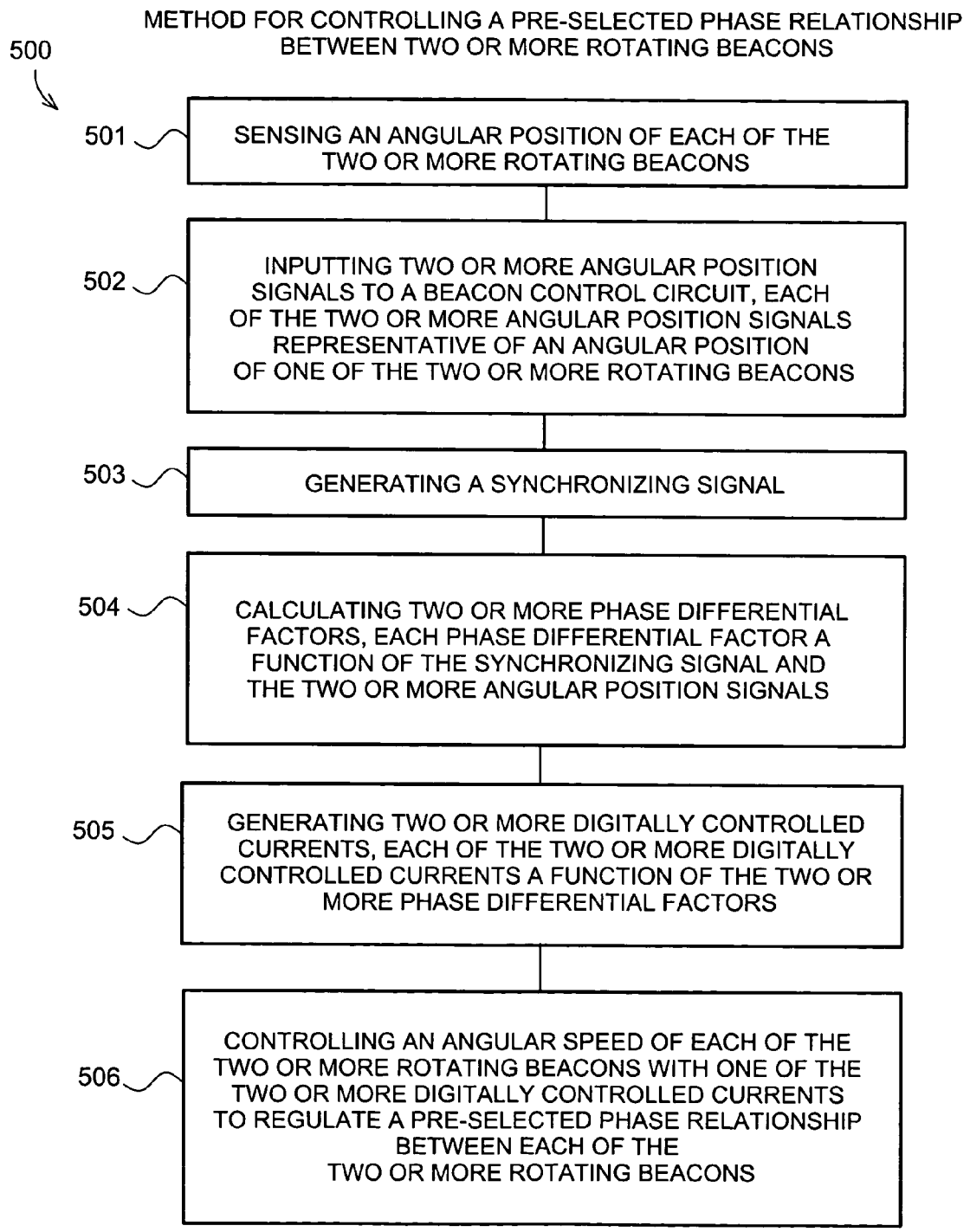
FIG. 5 is a schematic flow diagram depicting the steps of a method for controlling a pre-selected phase relationship between two or more rotating beacons according to a preferred embodiment of the present invention.

FIG. 5 is a schematic flow diagram depicting the steps of a METHOD FOR CONTROLLING A PRE-SELECTED PHASE RELATIONSHIP BETWEEN TWO OR MORE ROTATING BEACONS 500. The method 500 includes the steps of: SENSING AN ANGULAR POSITION OF EACH OF THE TWO OR MORE ROTATING BEACONS 501, INPUTTING TWO OR MORE ANGULAR POSITION SIGNALS TO A BEACON CONTROL CIRCUIT, EACH OF THE TWO OR MORE ANGULAR POSITION SIGNALS REPRESENTATIVE OF AN ANGULAR POSITION OF ONE OF THE TWO OR MORE ROTATING BEACONS 502, GENERATING A SYNCHRONIZING SIGNAL 503, CALCULATING TWO OR MORE PHASE DIFFERENTIAL FACTORS, EACH PHASE DIFFERENTIAL FACTOR A FUNCTION OF THE SYNCHRONIZING SIGNAL AND THE TWO OR MORE ANGULAR POSITION SIGNALS 504, GENERATING TWO OR MORE DIGITALLY CONTROLLED CURRENTS, EACH OF THE TWO OR MORE DIGITALLY CONTROLLED CURRENTS A FUNCTION OF THE TWO OR MORE PHASE DIFFERENTIAL FACTORS 505, and CONTROLLING AN ANGULAR SPEED OF EACH OF THE TWO OR MORE ROTATING BEACONS WITH ONE OF THE TWO OR MORE DIGITALLY CONTROLLED CURRENTS TO REGULATE A PRE-SELECTED PHASE RELATIONSHIP BETWEEN EACH OF THE TWO OR MORE ROTATING BEACONS 506.

While this invention has been described with reference to the detailed embodiments, this is not meant to be construed in a limiting sense. Various modifications to the described embodiments, as well as additional embodiments of the invention, will be apparent to persons skilled in the art upon reference to this description. It is therefore contemplated that the appended claims will cover any such modifications or embodiments as fall within the true scope of the invention.

What is claimed is:

1. A rotating beacon system comprising:
    a beacon control circuit;
    a first rotating beacon conductively connected to the beacon control circuit;
    a first angular position sensing device including a first magnetic strip attached to the first rotating beacon and a first magnetic field sensor positioned with respect to the first magnetic strip and adapted to sense a varying magneto resistance value of the first angular position indicator as the first angular position indicator rotates past the first magnetic field sensor and output a first angular position signal representative of an angular position of the first rotating beacon;
    a second rotating beacon conductively connected to the beacon control circuit;
    a second angular position sensing device including a second magnetic strip attached to the second rotating beacon and a second magnetic field sensor positioned with respect to the second magnetic strip and adapted to sense a varying magneto resistance value of the second angular position indicator as the second angular position indicator rotates past the second magnetic field sensor and output a second angular position signal representative of an angular position of the second rotating beacon;
    the beacon control circuit including a controller, a square wave signal generator and a pulse width modulated current generator, the beacon control circuit connected to the two or more angular position sensing devices, the beacon control circuit adapted to output a synchronizing signal, the square wave signal generator configured to output a square wave signal and the pulse width modulated current generator adapted to modulate a duty cycle of the square wave signal producing a first pulse width modulated current conducted to the first rotating beacon, driving and controlling the angular speed of the first rotating beacon, and a second pulse width modulated current conducted to the second rotating beacon, driving and controlling the angular speed of the second rotating beacon.

2. The rotating beacon system of claim 1 further comprising:
    the first rotating beacon including a first incandescent light emitting element; and
    the second rotating beacon including a second incandescent light emitting element.

3. The rotating beacon system of claim 1 further comprising:
    the first rotating beacon including a first light emitting diode; and
    the second rotating beacon including a second light emitting diode.

4. The rotating beacon system of claim 1 further comprising:
    the first rotating beacon including a first electric motor; and
    the second rotating beacon including a second electric motor.

5. The rotating beacon system of claim 1 further comprising:
    the first pulse width modulated current including the square wave signal modulated as a function of the synchronizing signal and the first angular position signal; and
    the second pulse width modulated current including the square wave signal modulated as a function of the synchronizing signal and the second angular position signal.

6. The rotating beacon system of claim 1 further comprising:
    the first pulse width modulated current including the square wave signal modulated to regulate the angular speed of the first rotating beacon; and the second pulse width modulated current including the square wave signal modulated to regulate the angular speed of the second rotating beacon.

7. The rotating beacon system of claim 1 further comprising:

the first pulse width modulated current including the square wave signal modulated to regulate the angular speed of the first rotating beacon; and the second pulse width modulated current including the square wave signal modulated to regulate the angular speed of the second rotating beacon to maintain a pre-selected phase relationship between the first rotating beacon and the second rotating beacon.

* * * * *